Sept. 8, 1959            K. BRAND            2,903,309

CAST CYLINDER FOR HYDRAULIC SYSTEMS

Filed April 24, 1956

Inventor
Karl Brand
by
Stevens, Davis, Miller + Mosher
his attorneys

2,903,309

CAST CYLINDER FOR HYDRAULIC SYSTEMS

Karl Brand, Ebern, near Bamberg, Germany, assignor to Kugelfischer Georg Schafer & Co., Schweinfurt, Germany Application April 24, 1956, Serial No. 580,304

Claims priority, application Germany May 4, 1955

4 Claims. (Cl. 309—3)

In hydraulic systems serving to transmit an actuating force or pressure to a remote point it is customary to provide both ends of the hydraulic transmission line with cast cylinders in which the operating pistons are arranged to slide. If such a hydraulic system is embodied, for example, in a brake system of an automotive vehicle, there is provided at one end of the hydraulic transmission line a master cylinder which serves to operate the working cylinders provided at the wheels of the vehicle.

It will be understood that the wheel brake cylinders serve the function of urging against the brake drums the brake lining members provided on the brake shoes so as to produce a braking action. The brake linings are subject to considerable wear in the course of their use, and this effect tends to affect the dependability of the action of the wheel brake cylinders; however, this has not yet been fully taken into account in the art.

Disadvantages similar to those mentioned above in regard to the wear of brake linings are observed in other types of hydraulic systems where they cause a greater or lesser amount of trouble.

The present invention eliminates the aforementioned drawbacks by providing the cast cylinders of hydraulic systems, particularly the wheel cylinders of fluid-operated brake systems, with a sleeve member made of a suitable non-rusting material, said sleeve acting as a liner for the sliding surface of the respective cylinder and thus making it impossible for the operating pistons to stick to such zones of the cylinder wall as may temporarily come out of contact with the pistons. It will thus be seen that the present invention resides, on the one hand, in solving the problem of obviating the formation of rust at those zones of the cylinder wall which come temporarily out of contact with the pistons or which will only rarely come in contact with the pistons, so as to prevent the piston during its operation from either seizing such zones or from being retarded or affected otherwise. On the other hand the invention provides a solution to the aforestated problem by providing the cylinder wall with a cladding in the form of a sleeve member of a suitable non-rusting material in order reliably to prevent the formation of rust at the zones mentioned.

In a specific embodiment of the invention, the said sleeve member may be forced against the cylinder wall by means of a bellmouthing tool. According to another feature of the invention the cylinder wall of the casting may be provided with annular grooves which are engaged by the displaced material of the sleeve member. In another embodiment of the invention the length of the said sleeve member may correspond to the length of the zone which comes temporarily out of contact with the piston, and the inner diameter of said sleeve member, after it has been forced against the cylinder wall, may be the same as the diameter of the remainder of the cylinder which is left unclad.

These and other objectives and advantages of the invention will be apparent during the course of the following specification, when read in connection with the accompanying drawings, in which.

Figure 1:
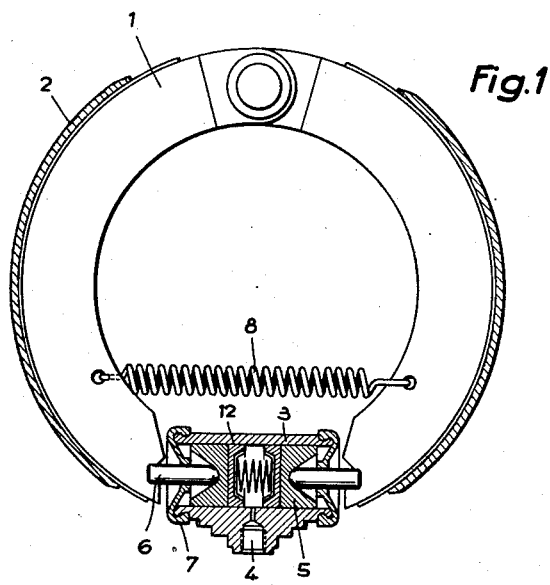
Fig. 1 is a front elevation, partly in section, of an example of a hydraulic system in which the invention may be used, the example being the wheel cylinder of a fluid brake system, shown here together with the brake operated thereby.

In the arrangement of Fig. 1 the brake shoes 1 to which the brake linings 2 are suitably attached, as by rivetings, and the wheel cylinder 3 are mounted on a common supporting member (not shown). From the master cylinder (not shown), the brake fluid under pressure enters into the wheel cylinder through the threaded pipe connection 4, causing the pistons 5 and their associated push rods 6 to be urged apart, thus causing the brake linings 2 to be urged against the brake drum not shown in the drawing. The pistons 5 will travel a distance which approximately corresponds to the clearance that has been adjusted between the brake lining 2 and the brake drum. Due to the frequent movements of the pistons, the respective zones of the wall of the wheel cylinder 3 are not subject to rust formation.

Rust can, however, be formed on those zones of the cylinder wall which come in contact with the pistons only after the brake linings 2 have been worn to a certain extent, since such zones can be attacked by water present in the cylinder without the pistons reaching said zones during their travel. Since the pistons are made of a relatively soft material, their movement will be hindered by the presence of rust and the pistons may even seize the rusty areas unless the tension spring 8 pulling the brake shoes together is strong enough to return the pistons to their original positions after they have reached zones of rust formation during actuation of the brake.

When the movements of the pistons 5 are thus hindered or when the pistons are even seized in position, a constant rubbing contact between the brake linings and the brake drum may result which in turn leads to an even more severe wear of the brake linings. Eventually a stage may be reached where it becomes impossible to produce any braking effort at all.

Figure 2:
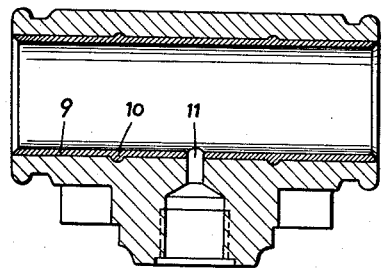
Figs. 2 and 3 show two different embodiments of cylinder-like systems according to the invention, the embodiments being shown in longitudinal section.
Figure 4:
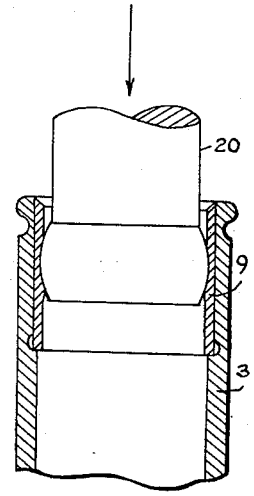
Figure 4 is a sectional view showing the step of expanding the sleeve by means of a mandrel.

In the embodiment of the invention illustrated in Fig. 2, the wheel cylinder 3 has inserted therein a sleeve or liner 9 made of a suitable non-rusting material. The arrangement of Fig. 2 may be obtained by first inserting into a machined bore of the cylinder casting 3 a sleeve 9 having an outside diameter slightly smaller than the inside diameter of the said bore, whereupon a mandrel 20 of slightly greater diameter is passed through the sleeve or liner in order to expand and thus to bring the outer diameter of the liner 9 into firm contact with the cylinder wall, as shown in Fig. 4. During this operation, part of the material of the non-rusting liner 9 will be forced into the retaining grooves 10. While the liner 9 is thus press-fitted into the wheel cylinder, the said grooves 10 hold the liner against axial displacement and also prevent any leakage of brake fluid between the cylinder bore and the outside of the liner. The retaining grooves 10 are disposed on either side of the passage 11 through which the brake fluid is introduced into the wheel cylinder, the passage 11 being aligned with the threaded bore 4 (see Fig. 1) which receives one end of the brake fluid pipe.

Figure 3:
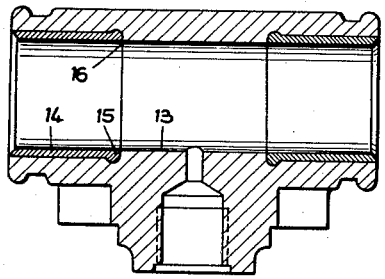

In the modified embodiment of Fig. 3 the sleeve or liner 14 which is press fitted into the bore 13 of the brake cylinder is of a reduced length, the length of the liner corresponding to the length of that zone of the cylinder bore which remains temporarily out of the contact with the piston. It will be understood that after expanding and press-fitting the liner 14 into the cylinder bore the inner diameter of the liner equals that of the unlined portion of the brake cylinder. In this embodiment the sealing cuff 12 (Fig. 1) will remain in contact with the unlined portion of the cylinder 13, whereas the piston 5 will be located within the liner 14 which is made of a non-rusting material.

In the case of the embodiment of Fig. 3 the liners can only be inserted from the outside in order to cause additional material to fill the retaining groove 15 located in advance of the shoulder formed in the casting. The press fitting operation will furthermore cause the material of the liner 14 to be pressed in firm contact with all irregularities that might be present in the face 16 of the said shoulder.

The other or right-hand end of the casting shown in Fig. 3 has inserted therein another liner of the same length as that of the liner just described. This second liner is inserted in an identical manner.

In similarity to the wheel cylinders of fluid brake systems described above to illustrate the invention, liners made of a non-rusting material may be press fitted into the cylinders of hydraulic systems of any other type in which the pistons for similar reasons are apt to travel different distances, so as to eliminate the formation of rust on those portions of the cylinder walls which come less frequently in contact with their associated pistons. It will be seen that the invention ensures a free sliding motion of the pistons in relation to the cylinder walls, and that thus the proper functioning of the hydraulic transmission system is ensured at all times.

It will be understood that modifications and variations may be effected without departing from the spirit and scope of the novel concepts of the present invention.

I claim:

1. The method of providing a cast cylinder for hydraulic actuating systems, particularly for use as a wheel cylinder in a fluid brake system for a vehicle, with a lining sleeve made of a non-rusting material in order to prevent the piston from sticking to those zones of the cylinder wall that temporarily remain out of contact with the piston; which consists in forming the cylinder with a bore having a fluid supply nipple and having annular retaining grooves formed in axially spaced relation on opposite sides of the nipple; inserting into the bore a sleeve having an outside diameter slightly smaller than the inside diameter of the bore and expanding the sleeve by means of a mandrel of slightly greater diameter than the inside diameter of said sleeve whereby part of the material of said sleeve will be forced into the retaining grooves and so that the sleeve tightly hugs the wall of the bore.

2. A cast cylinder for hydraulic actuating systems, particularly for use as a wheel cylinder for a fluid brake system comprising a cylinder having a bore formed with annular grooves arranged in axially spaced relation intermediate the ends thereof, a fluid supply nipple radially extending from the cylinder and the bore intermediate the grooves, a liner of non-rusting material tightly engaging the wall of the bore and having a portion of its material tightly fitting in the retaining grooves whereby the piston is prevented from sticking to those zones of the bore wall which temporarily remain out of contact with the piston.

3. A cast cylinder as claimed in claim 2, wherein the length of the sleeve corresponds to the length of the zones remaining out of contact with the piston and wherein the inner diameter of said sleeve equals the inner diameter of the bore.

4. The method of providing a cast cylinder for hydraulic actuating systems, particularly for use as a wheel cylinder in a fluid brake system for a vehicle, with a lining sleeve made of non-rusting material in order to prevent the piston from sticking to those zones of the cylinder wall that temporarily remain out of contact with the piston; which consists in forming the cylinder with a bore having a fluid supply nipple and having annular retaining grooves formed in axially spaced relation on opposite sides of the nipple; inserting into the bore a sleeve having an outside diameter slightly smaller than the inside diameter of the bore and expanding the sleeve to tightly fit it against the wall of the bore and expand it into the grooves so that the sleeve tightly hugs the wall and the grooves.

References Cited in the file of this patent

UNITED STATES PATENTS

| 221,223 | Epping | Nov. 4, 1879 |
| 1,746,925 | Bendix | Feb. 11, 1930 |
| 1,825,678 | Pittman | Oct. 6, 1931 |
| 2,613,431 | McGee | Oct. 14, 1952 |
| 2,754,577 | Maxwell | July 17, 1956 |
| 2,785,534 | Tucker | Mar. 19, 1957 |